(12) United States Patent
Schmitt et al.

(10) Patent No.: US 12,093,818 B2
(45) Date of Patent: Sep. 17, 2024

(54) METHOD AND SYSTEM FOR SEMI-SUPERVISED DEEP ANOMALY DETECTION FOR LARGE-SCALE INDUSTRIAL MONITORING SYSTEMS BASED ON TIME-SERIES DATA UTILIZING DIGITAL TWIN SIMULATION DATA

(71) Applicant: Honda Research Institute Europe GmbH, Offenbach/Main (DE)

(72) Inventors: Sebastian Schmitt, Offenbach (DE); Andrea Castellani, Civitanova Marche (IT); Stefano Squartini, Ancona (IT)

(73) Assignee: Honda Research Institute Europe GmbH, Offenbach/Main (DE)

( * ) Notice: Subject to any disclaimer, the term of this patent is extended or adjusted under 35 U.S.C. 154(b) by 892 days.

(21) Appl. No.: 17/069,846

(22) Filed: Oct. 13, 2020

(65) Prior Publication Data
US 2021/0110262 A1   Apr. 15, 2021

(30) Foreign Application Priority Data
Oct. 14, 2019   (EP) .................................... 19203001

(51) Int. Cl.
*G06N 3/08* (2023.01)
*G06N 3/045* (2023.01)

(52) U.S. Cl.
CPC ............... *G06N 3/08* (2013.01); *G06N 3/045* (2023.01)

(58) Field of Classification Search
CPC .......... G06N 3/08; G06N 3/045; G06N 3/088; G05B 23/0254; G05B 23/024
See application file for complete search history.

(56) References Cited

U.S. PATENT DOCUMENTS

| | | | |
|---|---|---|---|
| 2015/0234869 A1* | 8/2015 | Chan .................. | G06F 11/3003 707/603 |
| 2018/0210436 A1 | 7/2018 | Burd et al. | |

(Continued)

FOREIGN PATENT DOCUMENTS

WO   2018224669   12/2018

OTHER PUBLICATIONS

Utkin, L. et al., "A Siamese Autoencoder Preserving Distances for Anomaly Detection in Multi-Robot Systems", https://ieeexplore.ieee.org/document/8252959 (Year: 2017).*

(Continued)

*Primary Examiner* — Alexey Shmatov
*Assistant Examiner* — Devika S Maharaj
(74) *Attorney, Agent, or Firm* — JCIPRNET

(57) ABSTRACT

A computer-implemented method for detecting an anomalous operating status of a technical system. A training phase obtains a first set of time-series values generated by a digital twin simulation of the technical system for a regular operating status and a second set of time-series values measured by sensors in an anomalous operating status, and adjusts parameters of a machine learning model for detecting the regular operating status and for discriminating data samples of the regular operating status from data samples of the anomalous operating status to generate a trained machine learning model. A monitoring phase obtains a set of multi-variate time-series values measured by the sensors, calculates an anomaly score value for determining whether the technical system is in an anomalous operating status based on the obtained set of multi-variate time-series values and the trained machine learning model, and outputs a signal including information on the determined anomalous operating status.

12 Claims, 9 Drawing Sheets

(56) References Cited

U.S. PATENT DOCUMENTS

2019/0050515 A1 2/2019 Su et al.
2019/0147300 A1 5/2019 Bathen et al.
2020/0067969 A1* 2/2020 Abbaszadeh .......... G06N 20/10

OTHER PUBLICATIONS

Seo, E. et al., "GIDS: GAN based Intrusion Detection System for In-Vehicle Network", https://ieeexplore.ieee.org/stamp/stamp.jsp?arnumber=8514157, (Year: 2018).*
Liu, L. et al., "Effective Sensor Selection and Data Anomaly Detection for Condition Monitoring of Aircraft Engines", https://www.mdpi.com/1424-8220/16/5/623 (Year: 2016).*
"Search Report of Europe Counterpart Application", issued on Apr. 22, 2020, p. 1-p. 5.
Azad M. Madni, et al., "Leveraging Digital Twin Technology in Model-Based Systems Engineering," Systems, Jan. 2019, pp. 1-13.
Pavel Filonov, et al., "Multivariate Industrial Time Series with Cyber-Attack Simulation: Fault Detection Using an LSTM-based Predictive Data Model," NIPS Time Series Workshop 2016, Dec. 2016, pp. 1-8.

* cited by examiner

METHOD AND SYSTEM FOR SEMI-SUPERVISED DEEP ANOMALY DETECTION FOR LARGE-SCALE INDUSTRIAL MONITORING SYSTEMS BASED ON TIME-SERIES DATA UTILIZING DIGITAL TWIN SIMULATION DATA

CROSS-REFERENCE TO RELATED APPLICATION

This application claims the priority benefit of European application serial no. 19203001.3, filed on Oct. 14, 2019. The entirety of the above-mentioned patent application is hereby incorporated by reference herein and made a part of this specification.

TECHNICAL FIELD OF THE DISCLOSURE

The invention regards a method for semi-supervised deep anomaly detection on time-series data utilizing digital twin simulation data and a corresponding anomaly detection system. The method and system for anomaly detection concern in particular the field of large-scale industrial monitoring systems.

BACKGROUND

Detecting a system failure or an undesired operational state in a complex technical system is a difficult technical problem. A complex technical system or a complex machine includes a large number of elements and components. Direct and indirect interdependencies between the individual components usually do not allow an accurate global assessment of a current system status, even if appropriate sensor networks are installed which monitor relevant aspects of the system's operation. The sensor networks generate a large amount of data including sensor values. Inspecting the generated sensor data and the complicated interdependencies between individual components of the system result in a complex and computationally demanding task to decide if a current operating status is an anomalous operating status or undesired operating status on the one hand or a regular operating status on the other hand.

Generally, component failures or complete system failures need to be avoided as this involves a decreased availability of the technical system, and may lead to a significant increase in cost for operating the system. Often, precursors of component failures or system failures are observable in measured sensor data of a monitoring system designed to supervise the technical system by monitoring its key operating parameters. It is of paramount importance that relevant signals provided by the monitoring system based on the measured operational parameters are inspected and evaluated. A reliable detection of anomalies in the complex technical system is a key requirement to validate the proper function of the system, to detect problems before a component or system failure occurs. The reliable detection of anomalies in the complex technical system enables to schedule maintenance and repair operations of the technical system.

A fundamental problem in this field is given by the difficulty to produce an approach that captures all relevant instances of anomalous signals. This is the case for a high sensitivity, sometimes called true positive rate, recall, or probability of detection, of the monitoring system that monitors the technical system. Simultaneously, the monitoring system is required to produce only a modest number of false alarms. This corresponds to the monitoring system not identifying too many cases of a regular operating status as an anomalous operating status, usually termed a false positive rate.

Known rule-based monitoring systems rely on experts in the field implementing a set of checks and balances to ensure a proper operation of the technical system. The rule-based monitoring systems output messages in case of a detected anomaly. It does occur that an anomalous operating status or various anomalous situations are not properly captured by the rules and accordingly remain undetected for an extended period.

If the rule-based monitoring system relies on rules that are formulated too conservatively, the rule-based monitoring systems will generate many false alarms indicating an anomalous operating status although the monitored system is working in its regular and intended operating status. These false alarms may even overwhelm a human system operator with signals. This may eventually either result in the human system operator ignoring any alarm of the monitoring system, be it indeed a false alarm or a correct information on an anomalous operating status.

Anomaly detection may use different approaches. A common way relies on utilizing existing expert knowledge in the specific technical field. An expert in the field defines feasible ranges of sensor values and any deviation from these ranges (above a certain threshold) is considered an anomaly. This method has the disadvantage that it is difficult to define and implement rules and error conditions for usually complex technical systems. For complex systems with many interrelated components, the rules itself tend to become more complex.

Consequently, it is a demanding task to define a set of rules, which captures at least relevant operating states of the technical system properly, and does not include inconsistent or conflicting rules. Additionally, a resource demand for defining these rules and error conditions for large technical systems including many components grows fast.

An alternate approach to anomaly detection benefits from using the vast increase in simulation capabilities of recent years. Physical simulation models have reached a level of maturity and accuracy that they can replicate a behaviour of the real technical system. This applies in particular to applications, which utilize some real-world sensor data, for example, weather patterns. Such accurate physical simulation models for technical systems are usually termed digital twin simulations. For the purpose of system monitoring and anomaly detection, digital twin simulations can be efficiently used by running a digital twin simulation in parallel to the normal operation of the technical system. Both, the digital twin simulation and the technical system operating in the physical world, share the same environmental input quantities. It is possible to compare sensor measurements from the real, physical technical system to a corresponding output from the digital twin simulator, which allows for the detection of unusual and anomalous states, which might enable to conclude the occurrence of errors in the real technical system.

Current applications of digital twin simulation technology to industrial applications focus on various aspects like elucidating aging phenomena of the physical machine, support scheduling maintenance operations and enabling predictive maintenance, providing alternatives in what-if-scenarios, aiding business decisions and explorations of new business fields, among others. The publication "Leveraging Digital Twin Technology in Model-Based Systems Engineering" by Madni at al, in: *Systems* 7(1), 7 (2019) provides examples for this use of digital twin simulation technology.

Some scenarios employ the digital twin simulation technology running in parallel to the physical technical system with same input values and environmental conditions as the physical technical system. The digital twin simulation outputs a time-series data that can be compared to the corresponding time-series data from the physical technical system. Anomalies in the system behaviour of the technical system may then be detected based on their similarity, for example, as discussed by Filinov et al., in "Multivariate Industrial Time Series with Cyber-Attack Simulation: Fault Detection Using an LSTM-based Predictive Data", NIPS Time Series Workshop (2016).

The invention therefore targets the problem of devising an anomaly detection system with an acceptable balance between detection sensitivity and false alarms, which improves the current situation of substantial and continuous fine-tuning of the approaches to achieve the required balance between detection sensitivity and false alarms.

Data analytics and machine learning techniques have found their way into applications in real-world industrial setting. These apply to anomaly detection methods, which can be utilized for learning characteristics of the sensor data from the real-world technical system. The learned characteristics convey information, which enables to detect anomalies and undesired operating states of the technical system. Different approaches exist to apply machine learning techniques. Unsupervised approaches directly learn the dominant statistics of a measurement data set acquired for the real-world technical system without any a-priori information. There is, however, no explicit information on what an anomaly or an anomalous operating state is, provided to the model. The model makes this distinction based on implicit features of the measurement data. In contrast, supervised approaches for machine learning methods operate with a large training data set. The training data set includes data samples of regular operating states and anomalous operating states that are collected along with labelling information identifying the type of each data sample. Therefore, the models can be trained to learn the characteristics of the training data set and then discriminate between regular operating states and anomalous operating states. The supervised approach requires generating large sets of labelled training data samples, which is resource consuming and therefore involves significant time and cost.

In a semi-supervised or weakly supervised approach for a machine learning method, a large amount of unlabelled data along with a small set of labelled data is used to train a machine learning model to learn to discriminate between regular operating states and anomalous operating states.

SUMMARY

The computer-implemented method for detecting an anomalous operating status of a technical system according to a first aspect comprises steps of, in a training phase, obtaining a first set of time-series values generated by a digital twin simulation of the technical system for a regular operating status of the technical system, and obtaining a second set of time-series values measured by a plurality of sensors, the plurality of sensors configured to monitor a set of operational parameters of the technical system, wherein the plurality of sensors collects the second set of time-series values in an anomalous operating state of the technical system. The training phase then proceeds by executing a training step for adjusting parameters of a machine learning model for detecting the regular operating status of the technical system and for discriminating data samples of the regular operating status from data samples of the anomalous operating status by processing triples of data samples. Each of the triples of data samples comprises a first data sample, a second data sample and a third data sample. The first and second data samples are extracted from the first set of time-series values, and the third data sample is extracted from the second set of time-series values to generate a trained machine learning model. In a monitoring phase, the method for detecting an anomalous operating status of a technical system obtains a set of multivariate time-series values measured by the plurality of sensors. Then, an anomaly score value is calculated, the anomaly score value enabling to determine whether the technical system is in an anomalous operating status based on the obtained set of measures multi-variate time-series values and the trained machine learning model. Subsequently, a signal including information on the determined anomalous operating status of the technical system is generated and output.

A system according to second aspect of the invention is an anomaly detection system for detecting an anomalous operating status of a technical system. The anomaly detection system comprises a processor, wherein the processor is configured to run a digital twin simulation of the technical system for a regular operating status of the technical system to provide a first set of time-series values generated by the digital twin simulation The system further includes a plurality of interfaces for obtaining a second set of time-series values measured by a plurality of sensors. The plurality of sensors is configured to monitor a set of operational parameters of the technical system, wherein the plurality of sensors collects the second set of time-series values in an anomalous operating status of the technical system. The system further comprises a memory configured to store a first database comprising specific sequences of time-series values of the first set of time-series values generated by the digital twin simulation, and a second database comprising specific sequences of time-series values of the second set of time-series values measured by the plurality of sensors. The processor is configured, in a training phase, to execute a training step by adjusting parameters of a machine learning model for detecting the regular operating status of the technical system and for discriminating data samples of the regular operating status from data samples of the anomalous operating status by processing triples of data samples. Each of the triples of data samples comprises a first data sample and a second data sample each generated from the first set of time-series values, and a third data sample generated from the second set of time-series values to generate a trained machine learning model. In a monitoring phase, the processor is further configured to obtain a set of multivariate time-series values measured by the plurality of sensors, subsequently to calculate an anomaly score value for determining whether the technical system is in an anomalous operating status based on the obtained set of multi-variate time-series values and the trained machine learning model. The processor is further configured to generate a signal including information on the determined anomalous operating status of the technical system. The anomaly detection system further comprises an output stage for outputting the generated signal.

A non-transitory computer readable medium storing a program causing a computer or a digital signal processor to

BRIEF DESCRIPTION OF THE DRAWINGS

The discussion of an embodiment of the invention presented below refers to the annexed drawings.

Same reference signs in different figures denote same or corresponding elements. The discussion of same reference signs in different figures, where considered possible without adversely affecting comprehensibility, is avoided.

DETAILED DESCRIPTION

Figure 1:
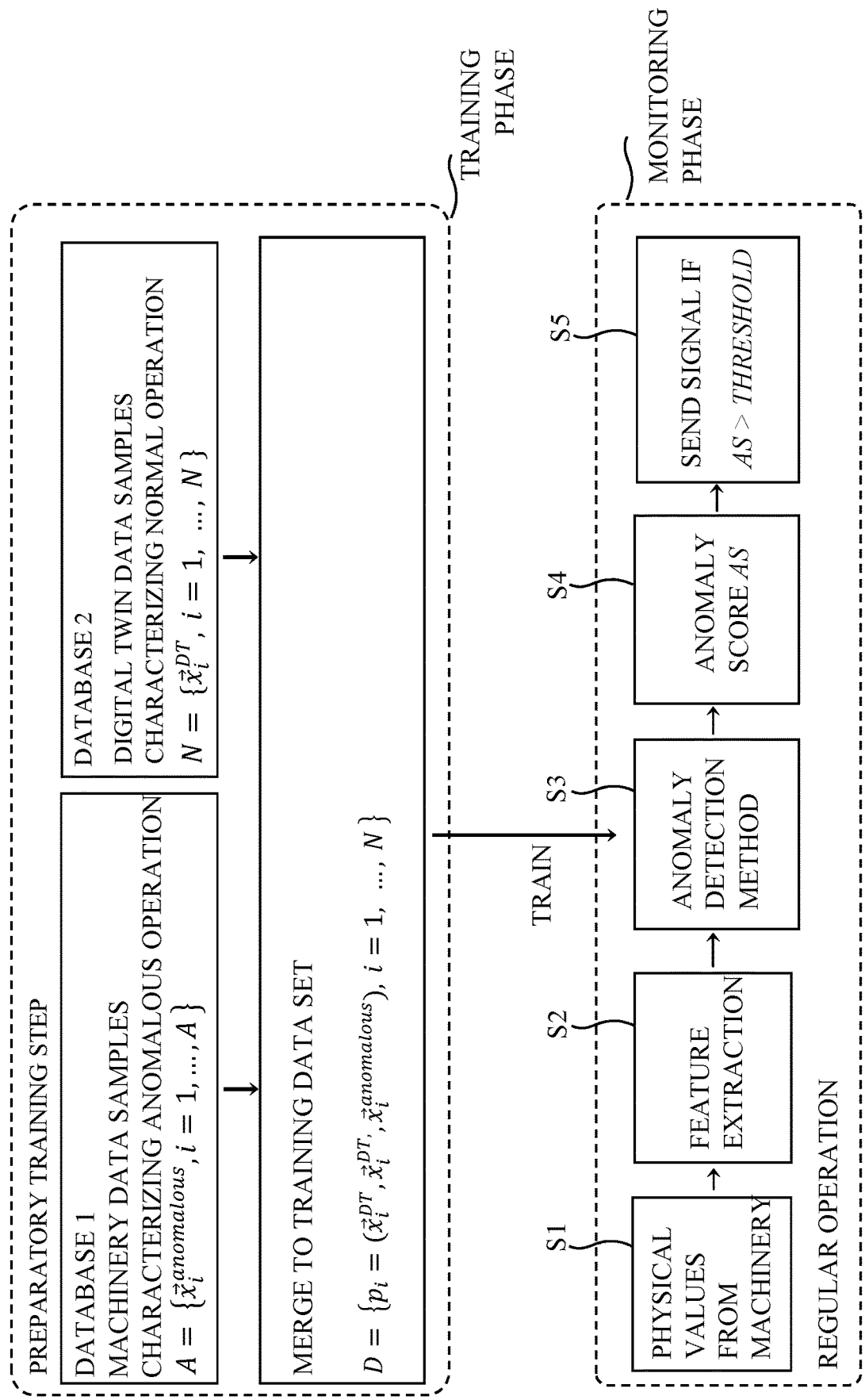
FIG. 1 provides an overview of the processing sequence of an embodiment of the method.

The invention proposes a novel system for detecting an anomalous operating status (operating state) and undesired operating states in a complex technical system (machinery), which is equipped with a sensor network, and for which additionally a digital twin simulation for the technical system exists. The digital twin simulation for the technical system procures (generates, provides) reliably regular operating states of the technical system in a virtual sphere. Additionally, a set of labelled anomaly data samples obtained from the real technical system in a physical sphere is available, which may be significantly smaller in number. The target for the monitoring system is to achieve very high performance for detecting an anomalous operating status with a low false positive and a high true positive rate, while simultaneously only minimal effort for the system operator of the technical system during setup and operation of the monitoring system is required. The central aspect of the invention achieves this target by using large amounts of data from the digital twin simulation. The data can be easily produced with limited human interaction required. The effort to produce the desired small set of anomalous data samples from the real-world physical technical system is also minimal as the few necessary instances of anomalous data samples are often available from the operational history of the technical system.

A good detection performance is achieved by using auto-encoder neural networks, which, even in the unsupervised setting without supervised training data, show good performance for anomaly scores derived from the reconstruction error. This is especially true as a regular large amount of operational data samples from the digital twin simulation enters the training phase of the inventive method. Including the few supervised data samples in the training data set and employing a Siamese auto encoder neural network architecture utilizes all available information on possible machine states without any further effort for the system operator in an efficient manner. The resulting anomaly detection method for the real technical system data has an anomaly detection performance exceeding the performance of state of the art with simultaneously limited effort for the system operator in setting up or initializing the anomaly detection method.

It is in particular preferred that the method comprises a step of comparing the calculated anomaly score value with a predetermined threshold value, and determines an anomalous operating status of the technical system in case of the calculated anomaly score value exceeding a threshold value.

Preferably, the triples of data samples constitute a training data set $\mathcal{D}$ comprising N triples of data samples. N is an integer number corresponding to the number of data samples in the first set of time-series values. Each triple of data sample includes the first data sample from the first set of time-series values, the second data sample, which is randomly selected from the first set of time-series values, and the third data sample which is randomly selected from the second set of time-series values. Thus, the entirety of triples is generated by combining each data sample from the first set of time-series values with a second data sample, randomly selected from the first set of time-series values and additionally with a third data sample, randomly selected from the second set of time-series values.

It is particularly advantageous, when the integer number N of data samples in the first set of time-series values is larger than an integer number J of data samples in the second set of time-series values.

An embodiment of the method uses as the machine learning model a Siamese twin neural network comprising two auto-encoder neural networks AE1 and AE2. The two auto-encoder neural networks AE1, AE2 share a same set and values of weights and parameters, which encode sensory input data $\vec{x} \in \mathbb{R}^D$ into a low-dimensional latent representation vector $\vec{l} = \text{Encode}(\vec{x}) \in \mathbb{R}^L$, and also decode the low-dimensional latent representation vector $\vec{l}$ back into an output signal $\vec{y} = \text{Decode}(\vec{l}) \in \mathbb{R}^D$ of the original form of the sensory input data. The weights and parameters of the auto-encoder neural networks AE1, AE2 are trained by minimizing a loss-function, the loss function comprising three parts, $$L = a\, L_{REC} + b\, L_{PCL} + c\, L_{CL}, \quad (1)$$

wherein a>0, b>0, and c>0 are freely adjustable parameters. A first part $L_{REC}$ is a reconstruction error for the digital twin simulation data as input to a first auto-encoder neural network AE1 of the two auto-encoder neural networks AE1, AE2:

$$L_{REC} = \frac{1}{N}\sum_{i=1}^{N} \left| \text{Decode}_1\left(\text{Encode}_1(\vec{x}_i^{DT})\right) - \vec{x}_i^{DT} \right|^2 \quad (2)$$

A second part $L_{PCL}$ is a partial contrastive loss from anomalous data samples calculated from a second auto-encoder neural network AE2 of the two auto-encoder neural networks AE1, AE2:

$$L_{PCL} = \frac{1}{2}\max\left(0,\, m - \frac{1}{N}\sum_{i=1}^{N} \left| \text{Decode}_2\left(\text{Encode}_2(\vec{x}_i^{anomalous})\right) - \vec{x}_i^{anomalous} \right|^2 \right)$$

and a third part $L_{CL}$ is a contrastive loss of latent representations calculated from the two auto-encoders AE1, AE2, $$L_{CL} = \frac{1}{N} \sum_{i=1}^{N} |\text{Encode}_2(\vec{x}_i^{DT'}) - \text{Encode}_1(\vec{x}_i^{DT})|^2 + \frac{1}{2} \max\left(0, m - \sqrt{\frac{1}{N} \sum_{i=1}^{N} |\text{Encode}_2(\vec{x}_i^{anomalous}) - \text{Encode}_1(\vec{x}_i^{DT})|^2}\right)^2 \quad (3)$$

A margin m>0 is an adjustable parameter. The training dataset $$\mathcal{D} = \{p_i = (\vec{x}_i^{DT}, \vec{x}_i^{DT'}, \vec{x}_i^{anomalous}), i=1, \ldots, N\}, \quad (4)$$

includes the triples of data samples. Each data sample from the first set of time-series values includes simulated digital twin data ($\vec{x}_i^{DT}$) that is augmented with the randomly chosen data sample from the same first set of time-series values including simulated digital twin data ($\vec{x}_i^{DT'}$):

$$\vec{x}_i^{DT'} = \text{random\_select\_i}(\{\vec{x}_j^{DT}, j=1, \ldots, N\}), \quad (5)$$

The randomly chosen third data sample from the first set of time-series values includes actually measured anomalous data, $$\vec{x}_i^{anomalous} = \text{random\_select\_i}(\{\vec{x}_j^{anomalous}, j=1, \ldots, A\}). \quad (6)$$

The freely adjustable parameters a, b, and c in the loss function L according to equation (1) can either be chosen to be fixed values during the entire (complete) training phase. In particular, the freely adjustable parameters a, b, and c may be set to a=b=c=1 during the entire training phase. Alternatively, the freely adjustable parameters a, b, and c may be changed over the course of the training phase, thereby increasing an efficiency of the training phase.

For example, the freely adjustable parameters are a=1, b=c=0 during a first part of the training phase and are a=b=c=1 during a second part of the training phase. This provides the effect that the machine learning model learns detecting the regular operating status during the first part of the training phase. Setting the freely adjustable parameters to a=b=c=1 during the second part of the training phase will subsequently refine the machine learning model to additionally learn to discriminate normal, regular operating states from anomalous operating states.

The first part of the training phase may be a first half of the training phase and the second part of the training phase may be a second half of the training phase. Alternatively, the freely adjustable parameters are a=1, b=c=0 during the first part of the training phase, the freely adjustable parameters are a=b=1 and c=0 during the second part of the training phase, and the freely adjustable parameters are a=b=c=1 during a third part of the training phase. The first part of the training phase may be a first third of the training phase and the second part of the training phase may be a second third of the training phase, and the third part of the training phase may be a final third of the training phase.

The method according to an embodiment uses, in the monitoring phase, the calculated anomaly score value of a new data sample $\vec{x}^{NEW}$, calculated from the set of multivariate time-series values measured by the plurality of sensors, which is directly provided by the reconstruction error of the first auto-encoder neural network AE1:

$$AS_a = |\text{Decode}_1(\text{Encode}_1(\vec{x}^{NEW})) - \vec{x}^{NEW}|^2 \quad (7)$$

Alternatively, the method may, in the monitoring phase, calculate the calculated anomaly score value of a new data sample $\vec{x}^{NEW}$ from the set of multivariate time-series values measured by the plurality of sensors, as a sum of the reconstruction error of the first auto-encoder neural network AE1 and an average Euclidean distance between a latent representation vector of the new data sample from the first auto-encoder neural network AE1 and a set of the latent representation vectors of digital twin simulation data from the training phase:

$$AS_b = |\text{Decode}_1(\text{Encode}_1(\vec{x}^{NEW})) - \vec{x}^{NEW}|^2 + \frac{1}{N'}\left(\sum_{i=1}^{N'} |\text{Encode}_2(\vec{x}_i^{DT}) - \text{Encode}_1(\vec{x}^{NEW})|^2\right)^{\frac{1}{2}} \quad (8)$$

The method according to an embodiment may, in the training phase, generate the data samples from the second set of time-series values obtained from a plurality of sensors by first aligning in time each time-series values of the second set of time-series values. Subsequently, a step of partitioning in time the time-series values of the aligned second set of time-series values from each sensor in a set of overlapping time windows of a predefined window length W is performed. Then, each data sample from a set of measured time-series values, starting at a same time of the time-windows over the plurality of sensors and extending for a predefined window length W over the aligned time-series values over the plurality of sensors is determined.

The method may, when determining each data sample from the set of measured time-series values, process the determined data sample further by calculating for each time-window, one or a plurality of statistical features from measured time-series values of the time-series segment within the time-window, the statistical features including in particular one of a mean value, a standard deviation, a median, various quantiles, a kurtosis, and a skewness.

Alternatively or additionally, the method according to an embodiment can, when determining each data sample from the set of measured time-series values, augment the determined data sample with additional data. The additional data can comprise in particular information on a day of the week, a work-hour-indicator, a holiday-indicator or a seasonal indicator, the seasonal indicator in particular specifying a season.

It is to be noted that the generation and processing of data samples is detailed above for the case of data samples from the set of measured time-series values. The generation of data samples and processing data samples is preferably done in a similar way for data samples generated from the first set of time-series values.

The anomaly detection system for detecting an anomalous operating status of a technical system may further include the plurality of sensors connected to the interfaces. The plurality of sensors includes sensors configured to determine at least one of a low pressure compressor rotational speed, a high pressure compressor rotational speed, a fuel flow rate, turbine inlet total temperature, a turbine inlet total pressure, a combustor inlet total temperature, a combustor inlet total pressure, an exhaust gas total temperature.

The anomaly detection system for detecting an anomalous operating status of a technical system may be configured to detect anomalous operating states of a technical facility management system, or an engine, in particular a turbofan engine or a dual shaft turbofan engine.

An embodiment of the invention is now discussed using an anomaly detection system for a technical system based on a Siamese auto-encoder neural network.

The application areas of such a systems are complex technical systems where multivariate time-series data is recorded during operation of the technical system. The multivariate time-series data is acquired by a plurality of sensors arranged in a distributed manner over the technical system. The technical system may be a building, for example, a large factory complex with its technical infrastructure, or a complex piece of machinery such as a twin shaft turbofan engine, which is of a rather compact layout compared to the abovementioned factory complex. However, both instances of a technical system share key characteristics, which result in applying the claimed invention providing essential advantages.

The following discussion of the invention refers to the technical system as machinery.

The invention uses a digital twin simulation model of the machinery which simulates all relevant regular operating states of the machinery and has the same output time-series output signals as the physical machinery. A digital twin simulation is a digital replica (virtual entity) of a physical entity. By bridging the physical sphere (real world) and the virtual sphere (digital world), data is transmitted seamlessly allowing the virtual entity to exist simultaneously with the physical entity.

The digital twin simulation integrates artificial intelligence, machine learning and software analytics with spatial network graphs to generate a digital simulation model that updates and changes as its physical counterpart changes. The digital twin simulation continuously learns and updates itself from multiple sources to represent its near real-time status, working condition or position. Digital twin simulation uses sensor data that conveys various aspects of its operating states, bases on the knowledge from human experts, such as engineers with deep and relevant industry domain knowledge; from other similar machines; from other similar fleets of machines; and from the larger systems and environment in which the digital twin simulation may be a part of. A digital twin simulation may also integrate historical data from past machinery usage and operating states into its digital model.

In the present context, the digital twin simulation refers to a digital replica of the machinery.

FIG. 1 provides an overview of the processing sequence of an embodiment of the method. A more detailed discussion follows with reference to FIGS. 2 to 9.

The method comprises a preparatory phase of generating two databases from measured sensor values from the physical machinery and corresponding simulated values from the virtual digital twin simulation. Specific aspects of the preparatory phase of generating two databases will be discussed with reference to FIGS. 2, 3 and 4.

The method comprises a training phase (preparatory training step). In the training phase, the system for detecting an anomalous status of the machinery (anomaly detection system) is trained with a dataset generated from digital twin simulation data samples stored in a first database augmented with data samples collected from the physical machinery stored in a second database. In particular, the training phase of the method for detecting an anomalous status of the machinery trains the model with the data set generated from a large amount of digital twin simulation data samples of the virtual machinery in the regular operating state augmented with the small set of (anomalous) data samples obtained from the plurality of sensors monitoring operating parameters of the physical machinery in an anomalous operating state.

The first database $\mathcal{N}$ comprises N sets of time-series data values $\vec{x}_j^{DT}$ originating from the digital twin simulation of the machinery in the virtual world, $$\mathcal{N} = \{\vec{x}_j^{DT}, j=1, \ldots, N\} \quad (9)$$

and the second database $\mathcal{A}$ comprises A sets of time-series data values $\vec{x}_j^{anomalous}$ originating from the physical machinery in the real world, $$\mathcal{A} = \{\vec{x}_j^{anomalous}, j=1, \ldots, A\} \quad (10)$$

The method generates in the training phase a training data set $\mathcal{D}$ based on the first database and the second database. The training data set $\mathcal{D}$ comprises triples of data samples:

$$\mathcal{D} = \{p_i = (\vec{x}_i^{DT}, \vec{x}_i^{DT\prime}, \vec{x}_i^{anomalous}), i=1, \ldots, N\}. \quad (11)$$

In each of the triples of data samples constituting the training data set $\mathcal{D}$, each data sample from the first database (digital twin data set), $\vec{x}_i^{DT}$, is augmented with a second data sample, $\vec{x}_i^{DT\prime}$ from the same first database, which is randomly selected, $$\vec{x}_i^{DT\prime} = \text{random\_select\_i}(\{\vec{x}_j^{DT}, j=1, \ldots, N\}) \quad (12)$$

and one data sample from the data sample $\vec{x}_i^{anomalous}$ from the second data base (physical machinery), which is randomly selected from the data sets stored in the second database, $$\vec{x}_i^{anomalous} = \text{random\_select\_i}(\{\vec{x}_j^{anomalous}, j=1, \ldots, A\}). \quad (13)$$

This training data set $\mathcal{D}$ is used to train the machine learning model in the training phase for refining the parameters of the model. The trained machine learning model generated in the training phase forms then the basis for the monitoring phase of the method.

In the monitoring phase, the trained machine learning model is used during operation of the machinery on data obtained from the physical machinery. This process is illustrated in the lower portion of FIG. 1.

During the monitoring phase, the operating states of the machinery are monitored by using time-series sensor values acquired by a plurality of sensors. The values are obtained by the system for detecting an anomalous operating status. The steps S1 to S5 of the monitoring phase may be performed in in each processing cycle (monitoring cycle) of the computer-implemented method for detecting and anomalous operating status.

In step S1, a set of multivariate times-series values from the plurality of sensors is obtained.

In step S2, the method performs feature extraction on the obtained set of multivariate times-series values. The extracted data sample (new data sample) is then provided to the anomaly detection model for further processing in step S3. In step S4, an anomaly score value AS indicative if the machinery is in an anomalous operating status is calculated.

The anomalous score value AS represents a determination value, which enables to determine if the machinery is indeed in an anomalous operating status. Determining whether the machinery is in an anomalous operating status may be performed by comparing the calculated anomaly score value with a predetermined threshold value. In case the comparison reveals that the calculated anomaly score value exceeds the predetermined threshold value, it is determined that the machinery is indeed in an anomalous operating status. If the machinery is determined to be in the anomalous operating status, the method proceeds to step S5. In step S5, information on the determined anomalous operating status of the machinery is generated and the information is subsequently output in a signal.

Figure 2:
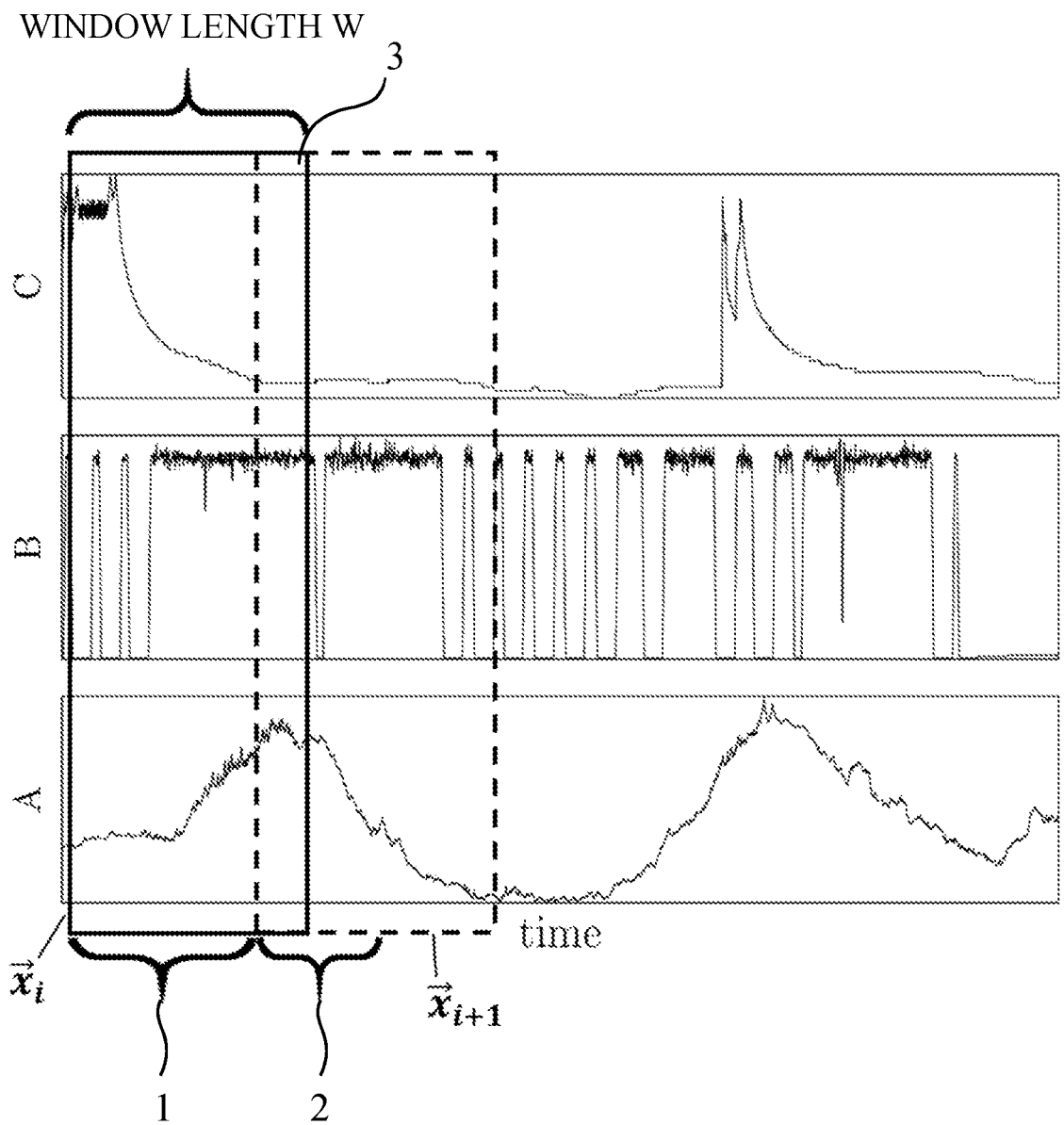
FIG. 2 illustrates the generation of input vectors forming the basis for anomaly detection according to an embodiment.

FIG. 2 illustrates the generation of input vectors forming the basis for anomaly detection according to an embodiment.

The method may execute a pre-processing of the obtained time-series of values, either obtained from the digital twin simulation of the machinery as first time-series of values or measured from the machinery as the second time-series of values, in order to generate data sets to be used for training of the machine learning model.

FIG. 2 depicts three time-series of values. A first time series of values may represent a first data stream A provided by a first sensor from the machinery or a corresponding simulation output stream generated by the digital twin simulation. A second data stream B and a third data stream C refer to respective data streams obtained from a second and third sensor of the plurality of sensors.

A time series of values refers to a sequence of measured values, which are sampled at regular time intervals and converted into a digital format.

The first time-series of values obtained from the digital twin simulation and the second time-series of values obtained from the plurality of sensors are pre-processed in the same manner.

All individual time-series of the multivariate time-series values are aligned with respect to time and a data sample is generated by extracting the time-series values within a time window of a predefined fixed window length W. The extracted time-series values are then stored in a sample vector $\vec{x}_i$.

A next data sample is extracted by moving the time window by a predetermined time and then selecting the time-series values within the shifted time window. The extracted time-series values are then stored in a sample vector $\vec{x}_{i+1}$.

FIG. 2 illustrates this approach for a first window position i in time and a second window position i+1 in time. The time windows for i and i+1 are shifted by a predetermined time 1 (stride). Subsequent time windows for i+1 and i+2 may be shifted by the predetermined time 1 or by a different further predetermined time 2, as indicated in FIG. 2. The time windows for i and i+1 may partially overlap in time, as depicted with an overlapping time generating an overlap area 3 in FIG. 2.

Figure 3:
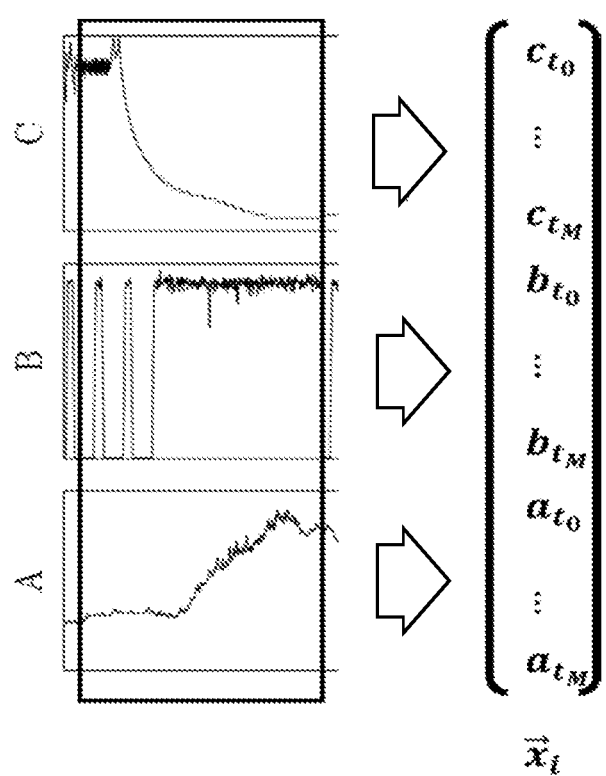
FIG. 3 illustrates a first example for feature extraction using sets of raw time-series values.

FIG. 3 illustrates a first example for feature extraction using sets of raw time-series values.

The feature extraction according to the first example uses raw-time series data. The raw time-series values of the measured curves or the simulated curves are directly stored in the sample vectors $\vec{x}_i$ as illustrated in FIG. 3.

Figure 4:
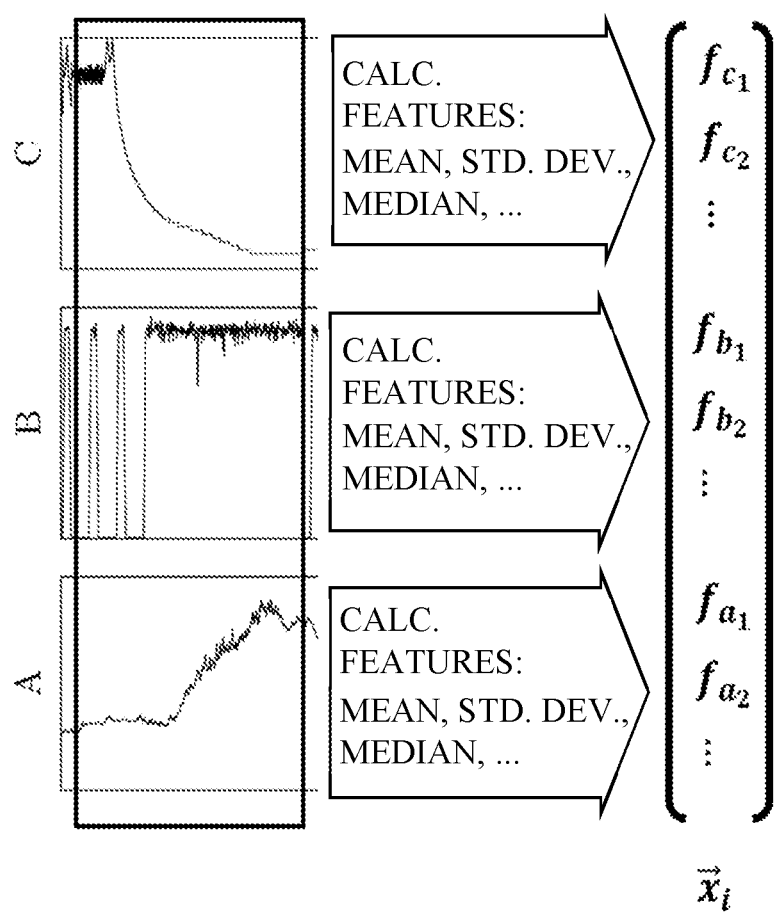
FIG. 4 illustrates a second example for feature extraction using statistical features calculated on sets of raw time-series values.

Alternatively or additionally, the time-series values of each measured curve or the time-series values of each simulated curve are post-processed with an additional statistical feature extraction step. The statistical feature extraction step calculates statistical features values for each time window based on the time-series values. The data sample vectors $\vec{x}_i$ and $\vec{x}_{i+1}$ are then generated by using those calculated statistical feature values. FIG. 4 illustrates this process of using the additional statistical feature extraction step.

Calculating statistical feature values may include calculating at least one of a mean value, a standard deviation, a median, a Kurtosis, as examples for statistical functions.

Additionally, it is also possible to include additional contextual, environmental, time-based, and other information in each extracted data sample (data sample vector $\vec{x}_i$), such as a reference to a week-day, a work-day indicator, work-time indicator, seasonal indicator, operating state indicators for components of the machinery. These examples for additional information may be used in combination with either the first example for feature extraction using sets of raw time-series values or the second example for feature extraction using statistical features calculated on sets of raw time-series values.

FIG. 4 illustrates the second example for feature extraction using statistical features calculated on sets of raw time-series values.

The data samples generated as described above are stored in a data storage device (memory) in two databases. A first database stores the first set of time-series values, which comprises data samples obtained from the digital twin simulation (virtual machinery) in the virtual world. A second database stores the second set of time-series values, which comprises data samples obtained from the machinery (physical machinery) in the real world.

The two separate databases therefore comprise the first database storing data samples derived from the digital twin simulations, preferably over a large time period and for regular operating states and the second database for comparatively few data samples from the real-world physical machinery in anomalous operating states.

Returning to FIG. 1, the feature extraction process discussed with reference to FIGS. 2, 3 and 4 also applies to the processing in step S2 on the new data samples obtained in step S1.

Figure 5:
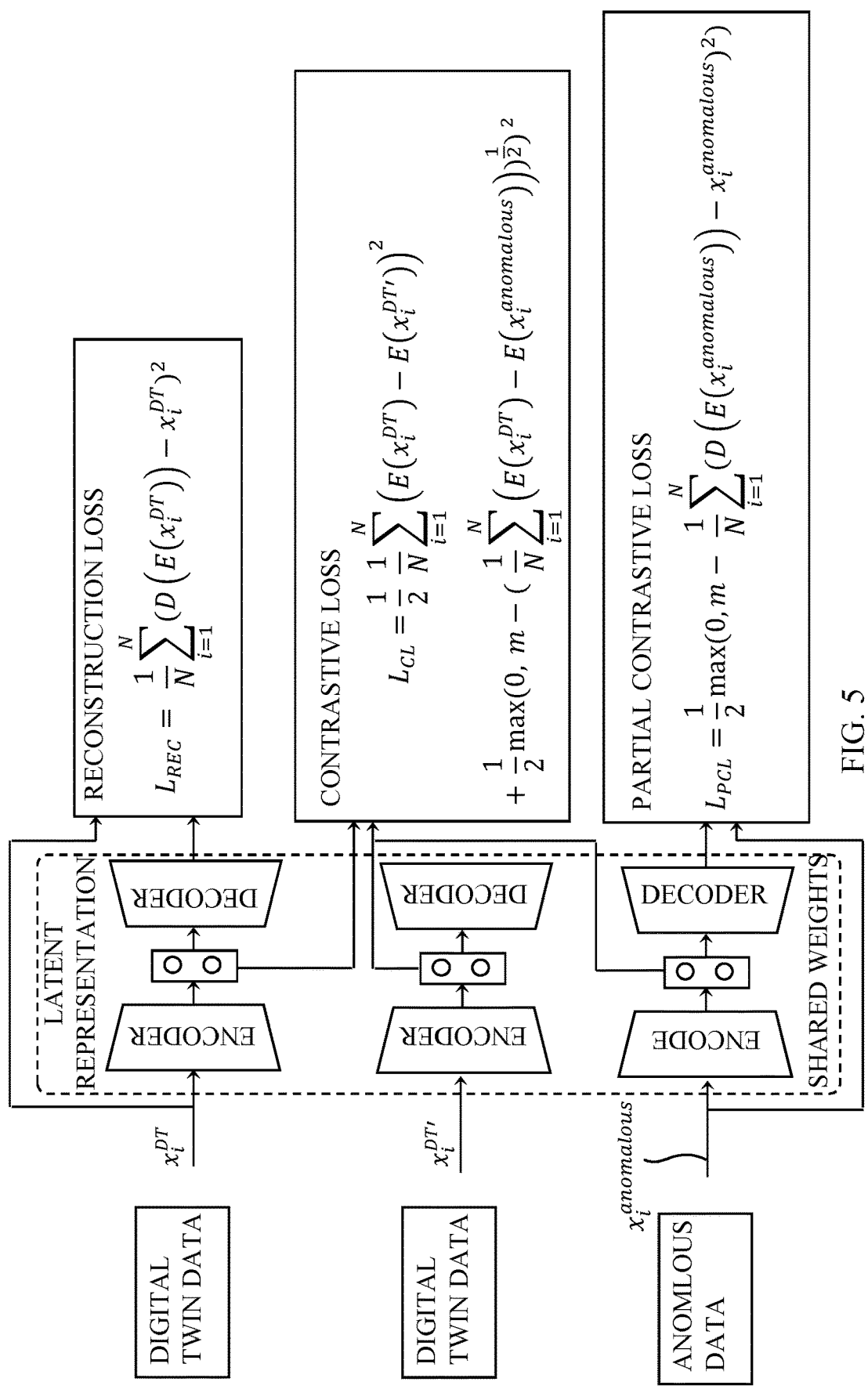
FIG. 5 shows the architecture of a deep Siamese neural network used in an embodiment.

An architecture for the Siamese auto-encoder used in an embodiment of the method is shown in FIG. 5.

The Siamese auto-encoder comprises two auto-encoder networks of the same (identical) architecture, a first auto-encoder network AE1 and a second auto-encoder AE2. The first auto-encoder network AE1 and the second auto-encoder network AE2 share the same weights and other parameters.

The first auto-encoder network AE1 and the second auto-encoder network AE2 process the training data set $\mathcal{D}$ above during the training phase.

A common approach in the training of deep neural architectures may be applied for the Siamese auto-encoder. The training data set $\mathcal{D}$ is partitioned into several batches and a training of the weights and the parameters of the first auto-encoder network AE1 and the second auto-encoder network AE2 can be performed with a stochastic gradient descent or an Adam optimizer. A loss function L to be minimized during the training of the Siamese auto-encoder comprises three terms, which contribute to the loss function:

$$L = a\, L_{REC} + b\, L_{PCL} + c\, L_{CL}, \quad (14)$$

wherein a, b and c are freely adjustable parameters. In particular, a>0, b>0 and c>0 applies for the (freely) adjustable parameters. A first term $L_{REC}$ is a reconstruction error for the digital twin simulation data. The reconstruction error for the digital twin simulation data targets the perfect reconstruction of normal operation data samples as specified by the digital twin simulation data. The reconstruction error can be calculated as a mean squared error (MSE) between the input signals and the output signal of the first auto-encoder network AE1, $$L_{REC} = \frac{1}{N} \sum_{i=1}^{N} |\text{Decode}_1(\text{Encode}_1(\vec{x}_i^{DT})) - \vec{x}_i^{DT}|^2 \quad (15)$$

In equation (15), N denotes an integer number corresponding to the number of data samples $\vec{x}_i^{DT}$ of the first database.

The second term $L_{PCL}$ contributing to the loss function L is a partial contrastive loss from the anomalous data samples calculated from the second auto-encoder AE2, $$L_{PCL} = \quad (16)$$
$$\frac{1}{2}\max\left(0, m - \frac{1}{N}\sum_{i=1}^{N}|\text{Decode}_2(\text{Encode}_2(\vec{x}_i^{anomalous})) - \vec{x}_i^{anomalous}|^2\right).$$

The second term $L_{PCL}$ is essentially a negative MSE of the data samples $\vec{x}_i^{anomalous}$ in the second database (anomalous data samples). Therefore, the MSE for the anomalous data samples is maximized as it drives the auto-encoder to have a very large reconstruction error for the anomalous data samples $\vec{x}_i^{anomalous}$. In equation (16), a margin m>0 is an adjustable parameter and allows only anomalous data samples whose distance is less than the radius defined by m to contribute to the loss function L.

The third term $L_{CL}$ contributing to the loss function L is a contrastive loss of the latent representations. The contrastive loss is calculated from the latent representations of both the first auto-encoder network AE1 and the second auto-encoder network AE2 as, $$L_{CL} = \frac{1}{N}\sum_{i=1}^{N}|\text{Encode}_2(\vec{x}_i^{DT'}) - \text{Encode}_1(\vec{x}_i^{DT})|^2 + \quad (17)$$
$$\frac{1}{2}\max\left(0, m - \sqrt{\frac{1}{N}\sum_{i=1}^{N}|\text{Encode}_2(\vec{x}_i^{anomalous}) - \text{Encode}_1(\vec{x}_i^{DT})|^2}\right)^2$$

This third term $L_{CL}$ minimizes an Euclidian distances between the latent representation vectors among data samples $\vec{x}_i^{DT}$ from the second data base (digital twin data samples) achieved by the first term, while at the same time it maximizes the Euclidian distance of the latent representation vectors between digital twin data samples $\vec{x}_i^{DT}$ and anomalous data samples $\vec{x}_i^{anomalous}$ according to the second term.

The freely adjustable parameters a, b, and c in the loss function L according to equation (14) can be chosen to be fixed values during the entire, complete training phase. In particular, the freely adjustable parameters a, b, and c may be set to a=b=c=1 during the entire training phase.

Alternatively the freely adjustable parameters a, b, and c may be changed over the course of the training phase, thereby increasing an efficiency of the training phase.

For example, the freely adjustable parameters are a=1, b=c=0 during a first part of the training phase and a=b=c=1 during a second part of the training phase. Then the machine learning model learns detecting the regular operating status during the first part of the training phase. Setting the freely adjustable parameters to a=b=c=1 during the second part of the training phase results in subsequently refining the machine learning model, respective its weights and parameters, to additionally learn discriminating regular operating states from anomalous operating states.

The first part of the training phase may be a first half of the training phase and the second part of the training phase may be a second half of the training phase.

Alternatively, the freely adjustable parameters are a=1, b=c=0 during the first part of the training phase, and the freely adjustable parameters are a=b=1 and c=0 during the second part of the training phase, and the freely adjustable parameters are a=b=c=1 during a third part of the training phase. The first part of the training phase may be a first third of the training phase and the second part of the training phase may be a second third of the training phase. The third part of the training phase may be a final third of the training phase.

For the case of raw time-series data values as input, the first and second auto-encoder networks AE1, AE2 can be realized as convolutional neural networks.

Figure 6:
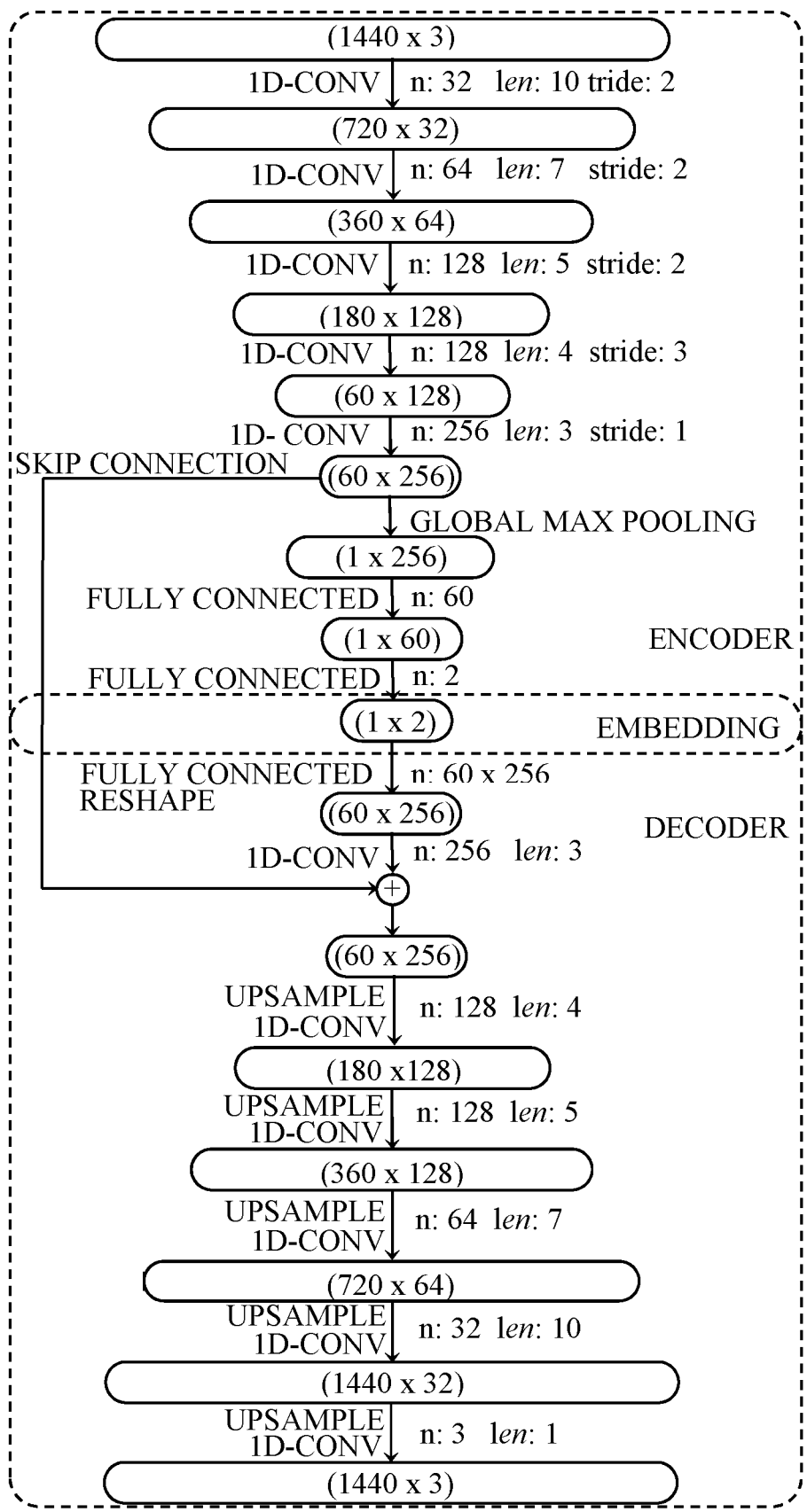
FIG. 6 illustrates a first example for an auto-encoder architecture using a convolutional network auto-encoder.
Figure 7:
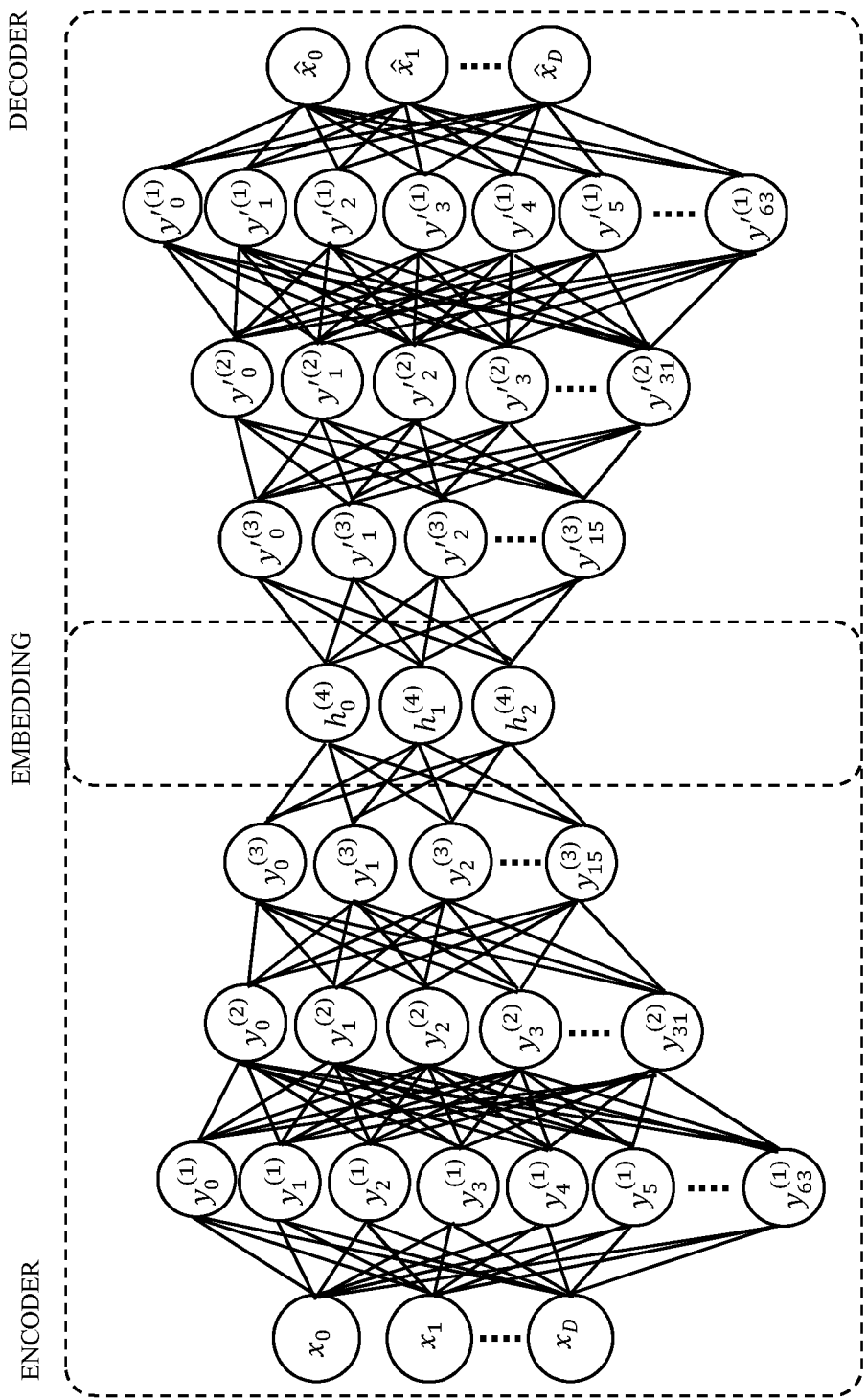
FIG. 7 illustrates a second example for an auto-encoder architecture using a fully connected feed-forward auto-encoder.

In case a statistical feature extraction process is performed on the raw time-series data values during feature extraction for each time window, the first and second auto-encoder networks AE1, AE2 may be realized as plain fully connected feed-forward neural networks. FIGS. 6 and 7 provide example architectures for both cases.

FIG. 6 illustrates a first example for an auto-encoder architecture using a convolutional network auto-encoder.

FIG. 7 illustrates a second example for an auto-encoder architecture using a fully connected feed-forward auto-encoder.

Additionally k-fold cross validation techniques with hyper-parameter optimization may be employed in order to improve performance.

For applying k-fold cross validation techniques with hyper-parameter optimization, the data set is divided into a training data set, a validation data set and a test set data set. k-fold cross validation techniques with hyper-parameter optimization employ a standard search algorithm, for example grid search, random search, or more techniques like irace for tuning the parameters of the auto-encoder networks AE1, AE2.

López-Ibáñez et al. discloses in "The irace package: Iterated Racing for Automatic Algorithm Configuration", Operations Research Perspectives, 3:43-58 (2016) details for implementing k-fold cross validation techniques with hyper-parameter optimization using advanced techniques.

Figure 8:
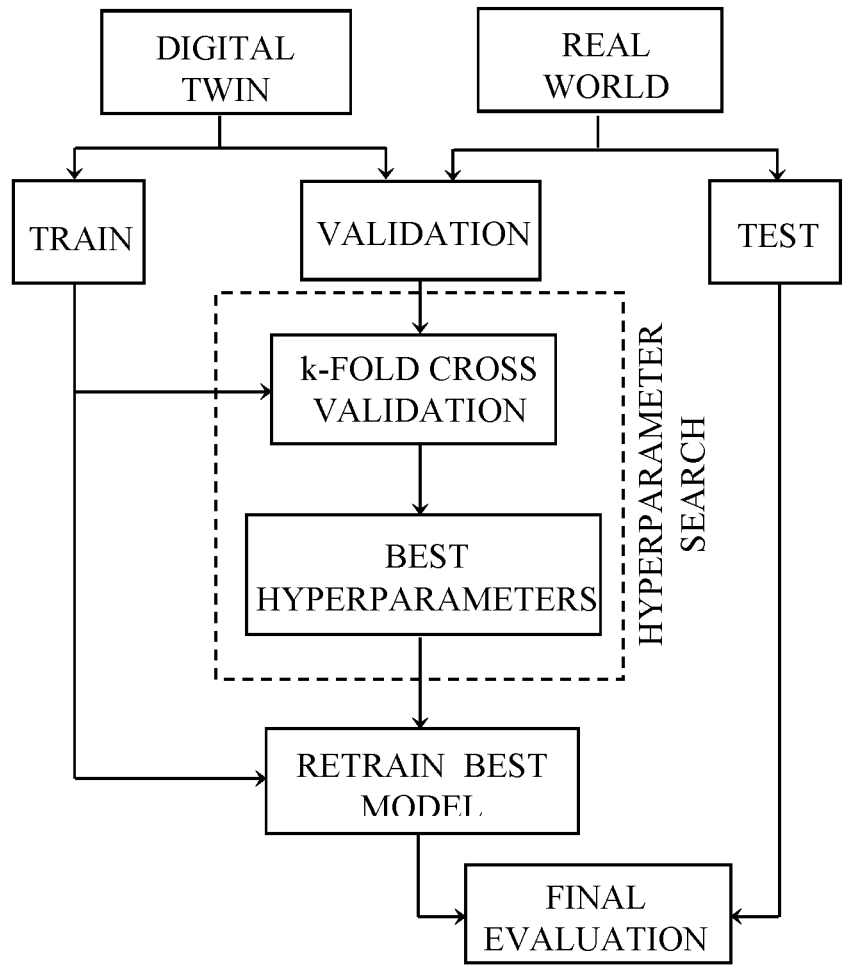
FIG. 8 provides a schematic representation of a cross-validation process flow.

FIG. 8 depicts a schematic representation of an approach applying a cross-validation process flow. Tuneable parameters of the auto-encoder networks AE1, AE2 are, for example, a number of channels, kernel sizes, a number of nodes per layer, a number of layers, a type of activation functions.

Further parameters, which might be tuned are one or more parameters from the pre-processing of the first and second sets of time-series data and feature extraction and include, for example, a window size W of the time-windows for the data samples, a window time overlap, a predetermined time between succeeding windows i and i+1, a number and type of statistical features to be extracted from the time-windows, additional variables to be included into the extracted data samples (feature vectors).

Figure 9:
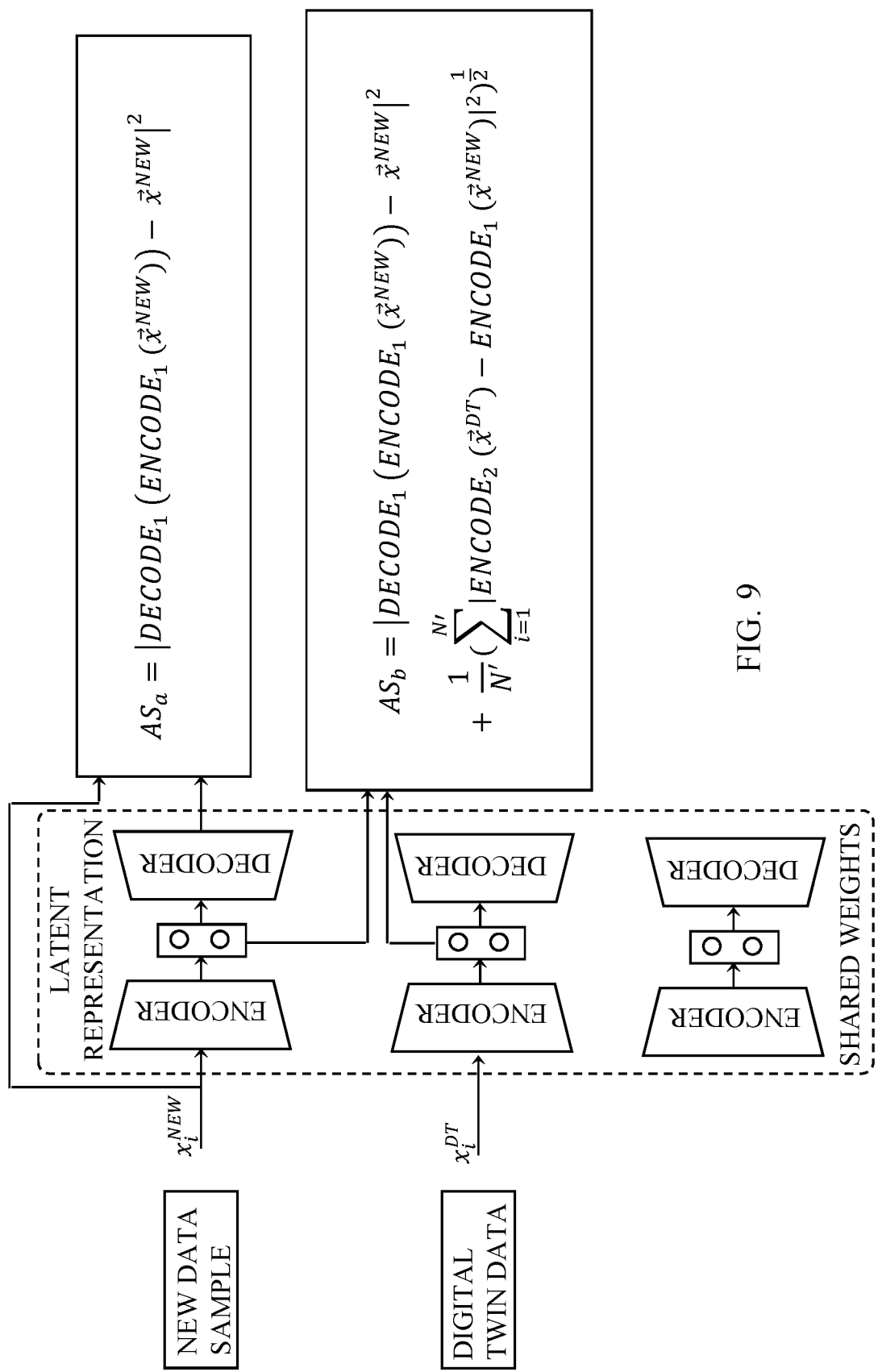
FIG. 9 illustrates an architecture for determining the raw anomaly score of a new data sample.

FIG. 9 illustrates a schematic architecture for determining the raw anomaly score value AS of a new data sample during the monitoring phase of the inventive method.

After completing the training phase, the Siamese auto-encoder based neural network architecture is efficiently used for generating a raw anomaly score value AS for each novel data sample in an online operation of monitoring the physical machinery.

During the monitoring phase, the raw anomaly score value $AS_a$ of a new data sample $\vec{x}^{NEW}$ extracted from the sensor data obtained by the plurality sensors is calculated.

In a first embodiment, the anomaly score value AS is provided directly as anomaly score value $AS_a$ by the reconstruction error $L_{REC}$ of the first auto-encoder network AE1 according to equation (15), $$AS_a = |Decode_1(Encode_1(\vec{x}^{NEW})) - \vec{x}^{NEW}|^2 \quad (18)$$

An alternate second embodiment calculates the anomaly score value AS as anomaly score value $AS_b$ by a sum of two terms using equation (19):

$$AS_b = \left|Decode_1(Encode_1(\vec{x}^{NEW})) - \vec{x}^{NEW}\right|^2 + \frac{1}{N'}\left(\sum_{i=1}^{N'}|Encode_2(\vec{x}_i^{DT}) - Encode_1(\vec{x}^{NEW})|^2\right)^{\frac{1}{2}}. \quad (19)$$

The first term (addend) of the sum in equation (19) corresponds to the reconstruction error $L_{REC}$ and the second term (addend) is an average Euclidean distance between a latent representation vector of the new data sample $\vec{x}^{NEW}$ and a set of digital twin data samples from the training phase. Depending on performance requirements and accuracy requirements, the set of digital twin data samples from the training phase can either be a subset of the digital twin training data set or the complete training data set $\mathcal{D}$.

The calculated anomaly score value AS, $AS_a$, $AS_b$ may then be used for comparing with the predetermined threshold in order to determine if the machinery is in a regular operating status or in an anomalous operating status.

When introducing the discussion of embodiments of the invention, two possibilities for technical systems are mentioned: while the cited dual shaft turbofan engine represents a more compact example for complex machinery, the technical system being an energy management system installed in a building facility represents another example for a complex technical system. The energy management system is arranged distributed over the building facility and includes a system for detecting an anomalous operating status applying the inventive approach.

The system for detecting an anomalous operating status and the energy management system may in particular comprise components as follows:
- a central heating and cooling system. The time-series values can be flow and return temperatures of the coolant and heating fluid respectively. Further time-series values describe an energy consumption of the heating and cooling devices of the central heating and cooling system;
- a plurality of air ventilation devices each including an electric power consumption meter providing further time-series values;
- a combined heat and power (CHP or cogeneration) device with sensors providing time-series values for electrical power consumption and thermal power output of the cogeneration device respectively;
- a weather sensor device providing weather data such as ambient temperature and air humidity measurement values as time series values;
- a photovoltaic system with sensor devices providing time-series values for electrical power generation;
- one or more electric vehicle charging stations, each fielding a sensor for generating time-series values for electrical power consumption when charging an electric vehicle;
- further appliances and office devices operating on electric power and each or at least those with power consumption in a relevant size with a metering device measuring individual electric power consumption and providing a respective time-series data values.

These elements (installations) in the facility are equipped with one or more sensors, which continuously measure time-series values and generate time-series data values therefrom. The measured time-series data values can be stored in a central monitoring server, which runs a time-series database. An implementation for setting up such time series database may be done using available products such as influxDB, for example.

Such energy management system may show many different types of anomalous operating states deviating from regular operating states. Types of anomalous operating states (anomalies) that may occur include:
- a sensor failure: a sensor does not provide an output signal. This is a major error as it results data loss. However, the sensor failure is generally easy to detect using standard means.
- a machine component fails and the associated sensor provides time-series values with actual value(s) in ranges which are beyond parameter specifications of the measured parameter. For example, the heating system ceases to operate. All measured temperature values will decrease to an ambient temperature value. All heating pumps stop operating. This can be easy to detect.
- a sensor provides measurement values, which represent physically impossible data. For example, a volume flow sensor of a heating fluid system shows high fluctuations in time, which is not physically possible since the fluid circulation inside a pipe physically cannot change that fast. This error is difficult to detect as it concerns the statistical properties of a times-series of measured values.
- a part of the machinery transitions into one operating status A, while another part goes into an incompatible operating status B. For example, the cooling compressors are not operating due to the absence of a cooling demand, but due to an error, the circulation and ventilation pumps of the cooling system run at high levels.
- unpredictable environmental interference. For example, during an on-site visit to a machine room, a human operator spontaneously decides to switch off the cogeneration device installed in this machine room in order to avoid elevated noise levels in the machine room. This is in principle not detectable from regular operating status, except that it then appears that the control mechanism determining an on- and off-switching of the cogeneration device appears to have changed status. However, after the human operator's intervention is reversed, the cogeneration device and the energy management system returns to a regular operating status.

For implementing the system for detecting an anomalous operating status, the energy management system and its installations and the facility were modelled with a digital twin simulation, which is realized is using the Modelica-based SimulationX tool together with the Green City library for modelling of building energy systems and e-mobility applications.

Rodemann and Unger provide in "Smart Company Digital Twin—Supporting Controller Development and Testing Using FMI", Japanese Society of Automotive Engineers Spring Meeting (2018) information for the digital twin simulation. The implementation further refers to Unger et al., "Green Building—Modeling renewable building energy system with eMobility using Modelica", in: Proceedings of Modelica conference (2012) for implementation details of the Modelica-based SimulationX tool in combination with the Green City library.

The digital twin simulation for the energy management system were performed generating time-series values for a time span ranging from November 2017 to May 2019. Real time series-values for weather measurement data was used as an input for the simulation. A digital twin data set is generated using the described method steps and stored in the first data base. A set of 100 anomalous scenarios for the energy management system showing anomalous operating states were collected from physical measurements of the physical energy management system during the cited period of time, which is covered by the digital twin simulation. The time-series values for the physical energy management system are stored in the first data base.

The generated first and second time-series values are then used to generate the training data set $\mathcal{D}$ for use in the training phase. Without any further human expert involvement, the system for detecting anomalous operating status is trained in the previously described manner. The results of the trained anomaly detection machine learning system proved a high anomaly detection performance in a test run of the monitoring phase.

What is claimed is:

1. A computer-implemented method for detecting an anomalous operating status of a technical system comprising a turbofan engine, the method comprising steps of:
in a training phase,
measuring, by a plurality of sensors, a set of operational parameters of the technical system including at least one of a low pressure compressor rotational speed, a high pressure compressor rotational speed, a fuel flow rate, turbine inlet total temperature, a turbine inlet total pressure, a combustor inlet total temperature, a combustor inlet total pressure, an exhaust gas total temperature,
obtaining a first set of time-series values generated by a digital twin simulation of the technical system for a regular operating status of the technical system,
obtaining a second set of time-series values measured by the plurality of sensors, wherein the plurality of sensors measure the second set of time-series values in an anomalous operating status of the technical system,
executing a training step by adjusting parameters of a machine learning model for detecting the regular operating status of the technical system and for discriminating data samples of the regular operating status from data samples of the anomalous operating status by processing triples of data samples, each of the triples of data samples comprising a first data sample and a second data sample both taken from the first set of time-series values, and a third data sample taken from the second set of time-series values, to generate a trained machine learning model,
wherein the triples of data samples constitute a training data set $\mathcal{D}$ comprising N triples of data samples, wherein N is an integer number corresponding to the number of data samples in the first set of time-series values, and each triple of data sample includes the first data sample from the first set of time-series values, the second data sample which is randomly selected from the first set of time-series values, and the third data sample which is randomly selected from the second set of time-series values, and
wherein the machine learning model is a Siamese twin neural network comprising two auto-encoder neural networks (AE1, AE2),
wherein the two auto-encoder neural networks (AE1, AE2) sharing a same set and values of weights and parameters, which encode sensory input data $\vec{x} \in \mathbb{R}^D$ into a low-dimensional latent representation vector $\vec{l} = \text{Encode}(\vec{x}) \in \mathbb{R}^L$, and decode the low-dimensional latent representation vector $\vec{l}$ back into an output signal $\vec{y} = \text{Decode}(\vec{l}) \in \mathbb{R}^D$ of the original form of the sensory input data, and wherein the weights and parameters of the auto-encoder neural networks AE1, AE2 are trained by minimizing a loss-function, the loss function comprising three parts, $$L = aL_{REC} + bL_{PCL} + cL_{CL}$$

wherein a>0, b>0, and c>0 are freely adjustable parameters and wherein a first part $L_{REC}$ is a reconstruction error for the digital twin simulation data as input to a first auto-encoder neural network (AE1) of the two auto-encoder neural networks (AE1, AE2), $$L_{REC} = \frac{1}{N}\sum_{i=1}^{N}|\text{Decode}_1(\text{Encode}_1(\vec{x}_i^{DT})) - \vec{x}_i^{DT}|^2$$

and a second part $L_{PCL}$ is a partial contrastive loss from anomalous data samples calculated from a second auto-encoder neural network (AE2) of the two auto-encoder neural networks (AE1, AE2), $$L_{PCL} = \frac{1}{2}\max\left(0, m - \frac{1}{N}\sum_{i=1}^{N}|\text{Decode}_2(\text{Encode}_2(\vec{x}_i^{anomalous})) - \vec{x}_i^{anomalous}|^2\right)$$

and a third part $L_{CL}$ is a contrastive loss of latent representations calculated from the two auto-encoders (AE1, AE2), $$L_{CL} = \frac{1}{N}\sum_{i=1}^{N}|\text{Encode}_2(\vec{x}_i^{DT'}) - \text{Encode}_1(\vec{x}_i^{DT})|^2 +$$

$$\frac{1}{2}\max\left(0, m - \sqrt{\frac{1}{N}\sum_{i=1}^{N}|\text{Encode}_2(\vec{x}_i^{anomalous}) - \text{Encode}_1(\vec{x}_i^{DT})|^2}\right)^2$$

wherein a margin m>0 is an adjustable parameter, the training dataset $$\mathcal{D} = \{p_i = (\vec{x}_i^{DT}, \vec{x}_i^{DT'}, \vec{x}_i^{anomalous}), i=1, \ldots, N\},$$

including the triples of data samples, wherein each data sample from the first set of time-series values including simulated digital twin data ($\vec{x}_i^{DT}$) is augmented with the randomly chosen data sample from the same first set of time-series values including simulated digital twin data ($\vec{x}_i^{DT'}$)

$$\vec{x}_i^{DT'} = \text{random\_select\_i}(\{\vec{x}_j^{DT}, j=1, \ldots, N\}),$$

and the randomly chosen third data sample from the first set of time-series values includes actually measured anomalous data, $$\vec{x}_i^{anomalous} = \text{random\_select\_i}(\{\vec{x}_j^{anomalous}, j=1, \ldots, A\}), \text{ and}$$

in a monitoring phase,
   obtaining a set of multivariate time-series values measured by the plurality of sensors,
   calculating an anomaly score value for determining whether the technical system is in an anomalous operating status based on the obtained set of multivariate time-series values and the trained machine learning model,
   generating and outputting a signal including information on the determined anomalous operating status of the technical system.

2. The method according to claim 1, wherein the method comprises a step of
   comparing the calculated anomaly score value with a predetermined threshold value, and determining an anomalous operating status of the technical system in case of the calculated anomaly score value exceeding the predetermined threshold value.

3. The method according to claim 1, wherein
the integer number N of data samples in the first set of time-series values is larger than an integer number J of data samples in the second set of time-series values.

4. The method according to claim 1, wherein,
during the training phase, the freely adjustable parameters a, b, c of the loss function are changed according to a predefined schedule,
in particular the freely adjustable parameters are a=1, b=c=0 during a first part of the training phase and a=b=c=1 during a second part of the training phase, or the freely adjustable parameters are a=1, b=c=0 during a first part of the training phase, and a=b=1 and c=0 during a second part of the training phase, and a=b=c=1 during a third part of the training phase.

5. The method according to claim 1, wherein,
in the monitoring phase,
the calculated anomaly score value of a new data sample $\vec{x}^{NEW}$, calculated from the set of multivariate time-series values measured by the plurality of sensors, is directly given by the reconstruction error of the first auto-encoder neural network AE1, $$AS_a = |\text{Decode}_1(\text{Encode}_1(\vec{x}^{NEW})) - \vec{x}^{NEW}|^2.$$

6. The method according to claim 4, wherein,
in the monitoring phase,
   the calculated anomaly score value of a new data sample $\vec{x}^{NEW}$ calculated from the set of multivariate time-series values measured by the plurality of sensors, is calculated as a sum of the reconstruction error of the first auto-encoder neural network (AE1) and an average Euclidean distance between a latent representation vector of the new data sample from the first auto-encoder neural network (AE1) and a set of the latent representation vectors of digital twin simulation data from the training phase, $$AS_b = |\text{Decode}_1(\text{Encode}_1(\vec{x}^{NEW})) - \vec{x}^{NEW}|^2 + \frac{1}{N'}\left(\sum_{i=1}^{N'}|\text{Encode}_2(\vec{x}_i^{DT}) - \text{Encode}_1(\vec{x}^{NEW})|^2\right)^{\frac{1}{2}}.$$

7. The method according to claim 1, wherein,
in the training phase,
   the data samples are generated from the first and/or the second set of time-series values obtained from the digital twin simulation or a plurality of sensors, respectively, by
   aligning in time each time-series values of the first or second set of time-series values,
   partitioning in time the time-series values of the aligned time-series values in a set of overlapping time windows of a predefined window length W,
   determining each data sample from a set of aligned time-series values, starting at a same time of the time-windows and extending for a predefined window length W over the aligned time-series values.

8. The method according to claim 7, wherein,
when determining each data sample from the set of time-series values, the determined data sample is further processed by calculating
   for each time-window, calculating one or a plurality of statistical features from time-series values of a time-series segment within the time-window, the statistical features including in particular one of a mean value, a standard deviation, a median, various quantiles, a kurtosis, and a skewness.

9. The method according to claim 7, wherein,
when determining each data sample from the set of time-series values,
augmenting the determined data sample with additional data, the additional data comprising in particular information on a day of the week, a work-hour-indicator, a holiday-indicator or a seasonal indicator, the seasonal indicator in particular specifying a season.

10. An anomaly detection system for detecting an anomalous operating status of a technical system comprising a turbofan engine, the anomaly detection system comprising:
   a plurality of sensors, wherein the plurality of sensors are configured to measure a set of operational parameters of the technical system including at least one of a low pressure compressor rotational speed, a high pressure compressor rotational speed, a fuel flow rate, turbine inlet total temperature, a turbine inlet total pressure, a combustor inlet total temperature, a combustor inlet total pressure, an exhaust gas total temperature;

a processor, wherein the processor is configured to run a digital twin simulation of the technical system for a regular operating status of the technical system to provide a first set of time-series values generated by the digital twin simulation;

a plurality of sensor interfaces connected to the plurality of sensors for obtaining a second set of time-series values of the set of operational parameters, wherein the plurality of sensors measure the second set of time-series values in an anomalous operating status of the technical system; and a memory configured to store a first data base comprising specific sequences of time-series values of the first set of time-series values generated by the digital twin simulation, and a second data base comprising specific sequences of time-series values of the second set of time-series values measured by the plurality of sensors, wherein the processor is configured, in a training phase, to execute a training step by adjusting parameters of a machine learning model based on the first set of time-series values for detecting the regular operating status of the technical system, and for discriminating data samples of the regular operating status from data samples of the anomalous operating status by processing triples of data samples, the each of the triples of data samples comprising a first data sample and a second data sample each from the first set of time-series values, and a third data sample from the second set of time-series values to generate a trained machine learning model, wherein the triples of data samples constitute a training data set $\mathcal{D}$ comprising N triples of data samples, wherein N is an integer number corresponding to the number of data samples in the first set of time-series values, and each triple of data sample includes the first data sample from the first set of time-series values, the second data sample which is randomly selected from the first set of time-series values, and the third data sample which is randomly selected from the second set of time-series values, wherein the machine learning model is a Siamese twin neural network comprising two auto-encoder neural networks (AE1, AE2), wherein the two auto-encoder neural networks (AE1, AE2) sharing a same set and values of weights and parameters, which encode sensory input data $\vec{x} \in \mathbb{R}^D$ into a low-dimensional latent representation vector $\vec{l} = \text{Encode}(\vec{x}) \in \mathbb{R}^L$, and decode the low-dimensional latent representation vector $\vec{l}$ back into an output signal $\vec{y} = \text{Decode}(\vec{l}) \in \mathbb{R}^D$ of the original form of the sensory input data, and wherein the weights and parameters of the auto-encoder neural networks AE1, AE2 are trained by minimizing a loss-function, the loss function comprising three parts, $$L = aL_{REC} + bL_{PCL} + cL_{CL}$$

wherein a>0, b>0, and c>0 are freely adjustable parameters and wherein a first part $L_{REC}$ is a reconstruction error for the digital twin simulation data as input to a first auto-encoder neural network (AE1) of the two auto-encoder neural networks (AE1, AE2), $$L_{REC} = \frac{1}{N} \sum_{i=1}^{N} |\text{Decode}_1(\text{Encode}_1(\vec{x}_i^{DT})) - \vec{x}_i^{DT}|^2$$

and a second part $L_{PCL}$ is a partial contrastive loss from anomalous data samples calculated from a second auto-encoder neural network (AE2) of the two auto-encoder neural networks (AE1, AE2), $$L_{PCL} = \frac{1}{2}\max\left(0, m - \frac{1}{N}\sum_{i=1}^{N}|\text{Decode}_2(\text{Encode}_2(\vec{x}_i^{anomalous})) - \vec{x}_i^{anomalous}|^2\right)$$

and a third part $L_{CL}$ is a contrastive loss of latent representations calculated from the two auto-encoders (AE1, AE2), $$L_{CL} = \frac{1}{N}\sum_{i=1}^{N}|\text{Encode}_2(\vec{x}_i^{DT'}) - \text{Encode}_1(\vec{x}_i^{DT})|^2 +$$

$$\frac{1}{2}\max\left(0, m - \sqrt{\frac{1}{N}\sum_{i=1}^{N}|\text{Encode}_2(\vec{x}_i^{anomalous}) - \text{Encode}_1(\vec{x}_i^{DT})|^2}\right)^2$$

wherein a margin m>0 is an adjustable parameter, the training dataset $$\mathcal{D} = \{p_i = (\vec{x}_i^{DT}, \vec{x}_i^{DT'}, \vec{x}_i^{anomalous}), i=1, \ldots, N\},$$

including the triples of data samples, wherein each data sample from the first set of time-series values including simulated digital twin data ($\vec{x}_i^{DT}$) is augmented with the randomly chosen data sample from the same first set of time-series values including simulated digital twin data ($\vec{x}_i^{DT'}$), and the randomly chosen third data sample from the first set of time-series values including actually measured anomalous data, $$\vec{x}_i^{anomalous} = \text{random\_select\_}i(\{\vec{x}_j^{anomalous}, j=1, \ldots, A\}), \text{ and}$$

the processor is further configured in a monitoring phase, to obtain a set of multivariate time-series values measured by the plurality of sensors, to calculate an anomaly score value for determining whether the technical system is in an anomalous operating status based on the obtained set of multi-variate time-series values and the trained machine learning model, and to generate a signal including information on the determined anomalous operating status of the technical system, and the anomaly detection system further comprises an output stage for outputting the generated signal.

11. The anomaly detection system for detecting an anomalous operating status of a technical system according to claim 10, wherein the turbofan engine is a dual shaft turbofan engine.

12. An anomaly detection system for detecting an anomalous operating status of a technical system comprising an energy management system of a building, the anomaly detection system comprising:
- a plurality of sensors, wherein the plurality of sensors are configured to measure a set of operational parameters of the technical system including at least one of flow and return temperatures of the coolant and heating fluid, energy consumption of heating and cooling devices of a central heating and cooling system, electric power consumption of a plurality of air ventilation devices, electrical power consumption and thermal power output of a combined heat and power cogeneration device, ambient temperature and air humidity measurement values, electrical power generation of a photovoltaic system, electrical power consumption when charging an electric vehicle at one or more electric vehicle charging stations, individual electric power consumption of appliances and office devices in the building;
- a processor, wherein the processor is configured to run a digital twin simulation of the technical system for a regular operating status of the technical system to provide a first set of time-series values generated by the digital twin simulation;
- a plurality of sensor interfaces connected to the plurality of sensors for obtaining a second set of time-series values of the set of operational parameters, wherein the plurality of sensors measure the second set of time-series values in an anomalous operating status of the technical system; and
- a memory configured to store a first data base comprising specific sequences of time-series values of the first set of time-series values generated by the digital twin simulation, and a second data base comprising specific sequences of time-series values of the second set of time-series values measured by the plurality of sensors, wherein the processor is configured, in a training phase, to
execute a training step by adjusting parameters of a machine learning model based on the first set of time-series values for detecting the regular operating status of the technical system, and
for discriminating data samples of the regular operating status from data samples of the anomalous operating status by processing triples of data samples, the each of the triples of data samples comprising a first data sample and a second data sample each from the first set of time-series values, and a third data sample from the second set of time-series values to generate a trained machine learning model,
wherein the triples of data samples constitute a training data set $\mathcal{D}$ comprising N triples of data samples, wherein N is an integer number corresponding to the number of data samples in the first set of time-series values, and each triple of data sample includes the first data sample from the first set of time-series values, the second data sample which is randomly selected from the first set of time-series values, and the third data sample which is randomly selected from the second set of time-series values, and
wherein the machine learning model is a Siamese twin neural network comprising two auto-encoder neural networks (AE1, AE2),
wherein the two auto-encoder neural networks (AE1, AE2) sharing a same set and values of weights and parameters, which encode sensory input data $\vec{x} \in \mathbb{R}^D$ into a low-dimensional latent representation vector $\vec{l} = \text{Encode}(\vec{x}) \in \mathbb{R}^L$, and decode the low-dimensional latent representation vector $\vec{l}$ back into an output signal $\vec{y} = \text{Decode}(\vec{l}) \in \mathbb{R}^D$ of the original form of the sensory input data, and wherein the weights and parameters of the auto-encoder neural networks AE1, AE2 are trained by minimizing a loss-function, the loss function comprising three parts, $$L = aL_{REC} + bL_{PCL} + cL_{CL}$$

wherein a>0, b>0, and c>0 are freely adjustable parameters and wherein a first part $L_{REC}$ is a reconstruction error for the digital twin simulation data as input to a first auto-encoder neural network (AE1) of the two auto-encoder neural networks (AE1, AE2), $$L_{REC} = \frac{1}{N} \sum_{i=1}^{N} |\text{Decode}_1(\text{Encode}_1(\vec{x}_i^{DT})) - \vec{x}_i^{DT}|^2$$

and a second part $L_{PCL}$ is a partial contrastive loss from anomalous data samples calculated from a second auto-encoder neural network (AE2) of the two auto-encoder neural networks (AE1, AE2), $$L_{PCL} = \frac{1}{2} \max\left(0, m - \frac{1}{N}\sum_{i=1}^{N}|\text{Decode}_2(\text{Encode}_2(\vec{x}_i^{anomalous})) - \vec{x}_i^{anomalous}|^2\right)$$

and a third part $L_{CL}$ is a contrastive loss of latent representations calculated from the two auto-encoders (AE1, AE2), $$L_{CL} = \frac{1}{N}\sum_{i=1}^{N}|\text{Encode}_2(\vec{x}_i^{DT'}) - \text{Encode}_1(\vec{x}_i^{DT})|^2 +$$

$$\frac{1}{2}\max\left(0, m - \sqrt{\frac{1}{N}\sum_{i=1}^{N}|\text{Encode}_2(\vec{x}_i^{anomalous}) - \text{Encode}_1(\vec{x}_i^{DT})|^2}\right)^2$$

wherein a margin m>0 is an adjustable parameter,
the training dataset $$\mathcal{D} = \{p_i = (\vec{x}_i^{DT}, \vec{x}_i^{DT'}, \vec{x}_i^{anomalous}), i=1, \ldots, N\},$$

including the triples of data samples, wherein each data sample from the first set of time-series values including simulated digital twin data ($\vec{x}_i^{DT}$) is augmented with the randomly chosen data sample from the same first set of time-series values including simulated digital twin data ($\vec{x}_i^{DT'}$),
and the randomly chosen third data sample from the first set of time-series values including actually measured anomalous data, $$\vec{x}_i^{anomalous} = \text{random\_select\_}i(\{\vec{x}_j^{anomalous}, j=1, \ldots, A\}), \text{ and}$$

the processor is further configured in a monitoring phase, to
obtain a set of multivariate time-series values measured by the plurality of sensors, to
calculate an anomaly score value for determining whether the technical system is in an anomalous operating status based on the obtained set of multi-variate time-series values and the trained machine learning model, and to generate a signal including information on the determined anomalous operating status of the technical system, and the anomaly detection system further comprises an output stage for outputting the generated signal.

* * * * *